Figure 1:
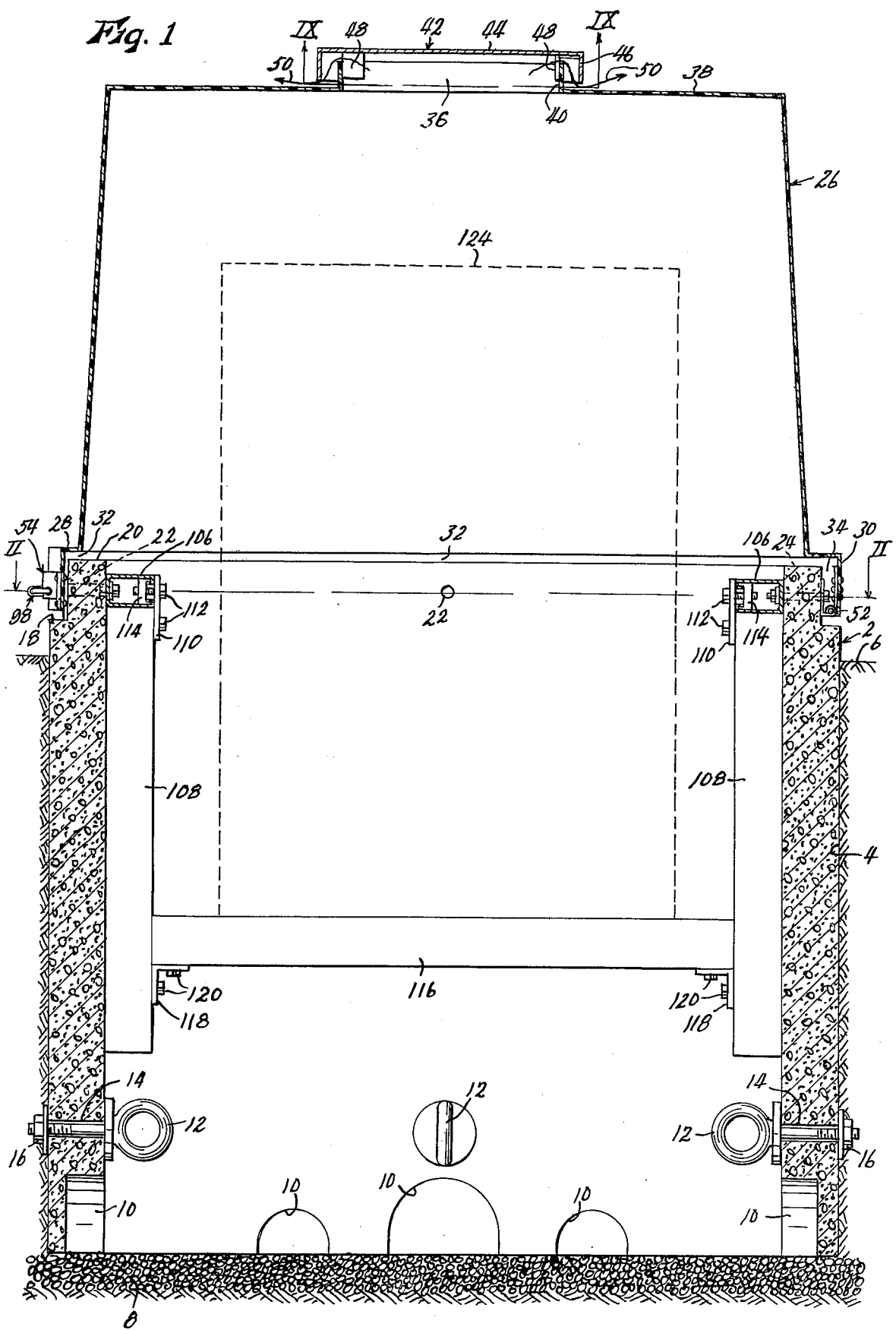

United States Patent [19]

Walter

[11] 4,005,253
[45] Jan. 25, 1977

[54] GRADE-LEVEL ENCLOSURE FOR ELECTRICAL APPARATUS

[76] Inventor: Gerald W. Walter, 1326 S. 52nd Terrace, Kansas City, Kans. 66106

[22] Filed: May 14, 1975

[21] Appl. No.: 577,229

[52] U.S. Cl. .................................. 174/37; 52/20; 70/229; 70/DIG. 57; 174/16 R; 220/18; 292/251

[51] Int. Cl.² ................... H02G 9/10; E02D 29/14; E04H 5/06

[58] Field of Search .............. 174/16 R, 37, 38, 39, 174/50, 52 R; 52/19–21; 70/229, DIG. 57; 137/363, 364, 371; 220/3.8, 3.94, 18; 292/251

[56] References Cited

UNITED STATES PATENTS

| | | | |
|---|---|---|---|
| 374,458 | 12/1887 | Davis | 174/37 X |
| 2,717,275 | 9/1955 | Hayden et al. | 174/37 |
| 3,162,718 | 12/1964 | Gunthel, Jr. | 174/38 |
| 3,263,378 | 8/1966 | Dorris | 174/37 X |
| 3,279,838 | 10/1966 | Hamilton | 174/38 X |
| 3,360,752 | 12/1967 | Uptegraff, Jr. | 174/16 R X |
| 3,464,580 | 9/1969 | Jones | 220/18 |
| 3,587,908 | 6/1971 | Nickel | 220/18 X |
| 3,728,464 | 4/1973 | Griffing | 174/16 R |
| 3,760,234 | 9/1973 | Jones et al. | 174/38 X |
| 3,784,727 | 1/1974 | Haubein | 174/52 R |

FOREIGN PATENTS OR APPLICATIONS

| | | | |
|---|---|---|---|
| 365,122 | 12/1962 | Switzerland | 174/38 |

*Primary Examiner*—Laramie E. Askin
*Attorney, Agent, or Firm*—John A. Hamilton

[57] ABSTRACT

A grade-level enclosure for transformers and other electrical apparatus used in utility electric distribution systems, comprising a hollow, open-ended concrete box adapted to be partially embedded in the ground and to extend above ground level, and an open-bottomed cover for the box, whereby to complete the enclosure for the electrical apparatus, special provisions being made for supporting the apparatus in the enclosure, ventilating the enclosure interior efficiently, but preventing the insertion of foreign objects through the ventilation openings, and rendering access for installation, maintenance and servicing of the equipment easy and convenient, while at the same time providing a high degree of security against tampering or entry by unauthorized persons, and a high degree of safety against electrical shock or other injury.

7 Claims, 9 Drawing Figures

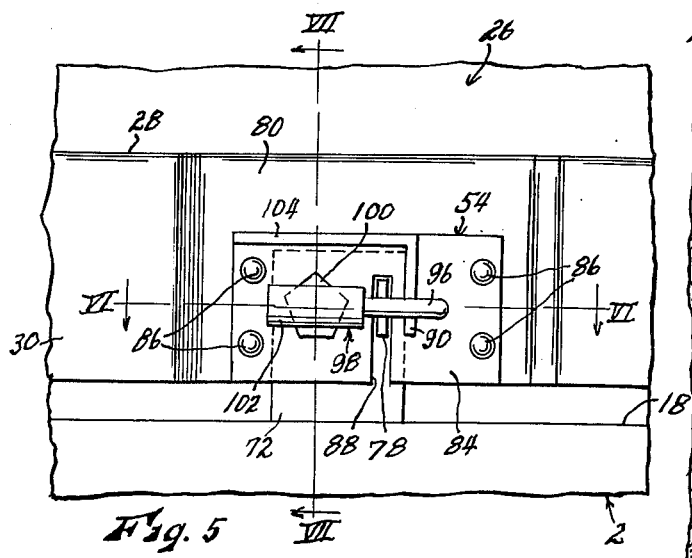
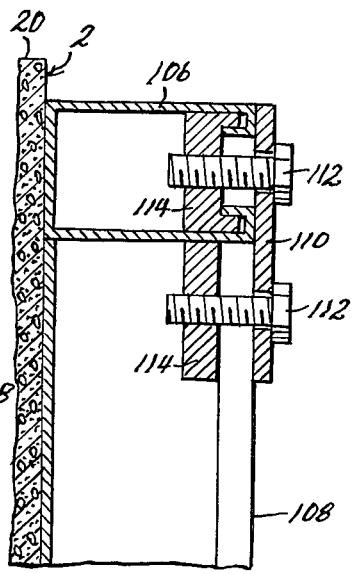
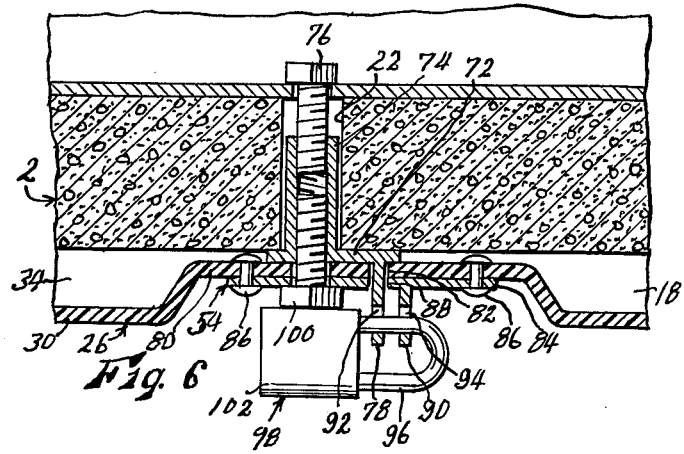
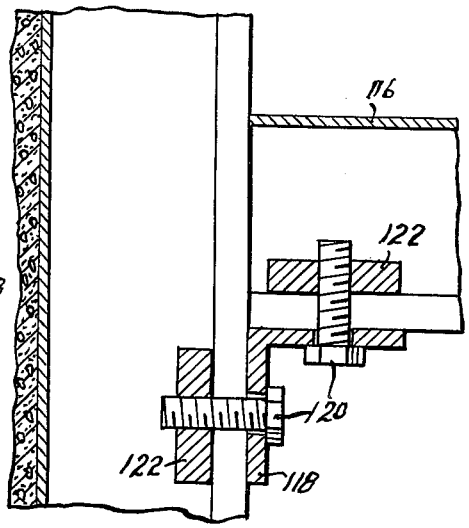
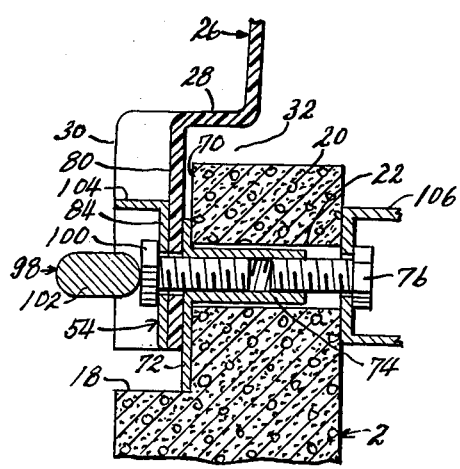
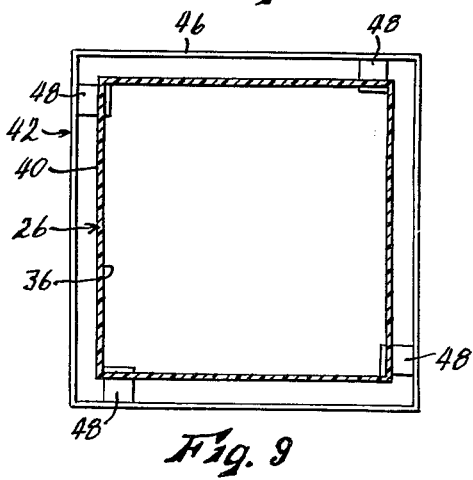

GRADE-LEVEL ENCLOSURE FOR ELECTRICAL APPARATUS

This invention relates to new and useful improvements in enclosures for electrical apparatus, such as transformers and their related fusing and switch gear, commonly used by utility operations in distribution systems for electric power, and has particular reference to enclosures of this type suitable for installation and use at ground level.

In recent years, utilities have more and more been attracted to the use of underground cables and conduits in distribution systems, in preference to the older system of overhead lines supported by poles. The pole system is of course unsightly and detrimental to the appearance of the landscape, and this is increasingly becoming a matter of public concern. However, even in systems using underground lines, there must be transformers, switching and fusing gear and the like, which furthermore must be accessible for maintenance, repair, replacement and servicing. This gear could of course be housed in underground "manholes", but these present the problems of high cost, lack of safety due to underground moisture, and relative lack of accessibility to service crews. Accordingly, there has been an increasing interest in some type of surface-mounted station for mounting the transformers and related equipment, since they are cheaper, safer, provide easier access for service crews, and have lower maintenance costs. Also, they may generally be provided with a sufficiently low profile that they may easily be concealed, for esthetic reasons, by shrubbery planted thereabout.

However, surface or grade-level installations also present certain problems. If the equipment mount comprises a concrete slab or pad poured on surface ground, the ground may shift causing the slab to tilt and throw the equipment out of plumb, which cannot be tolerated with certain types of equipment, and requires re-levelling. This is particularly true if the ground is loose and uncompacted at the time of installation, as is often the case. The apparatus must be completely enclosed, to prevent access thereto by unauthorized persons, which would be extremely hazardous in view of the high voltage circuits usually passing through the apparatus, while at the same time the apparatus must be readily accessible for servicing by work crews. Thus the enclosure must be readily opened by crew members, but still provide a high degree of security against tampering by unauthorized persons, such as children. The enclosure must be thoroughly ventilated in view of the apparatus it contains, but any ventilation openings should not permit the insertion of foreign objects into the enclosure, which also could be extremely hazardous in view of the high voltage apparatus. Ventilation openings may admit wind-driven rain or other moisture, but any such moisture cannot be allowed to accumulate, and must be disposed of. Also, the entry or pulling-in of underground conduits and cables into such enclosures often presents problems. Finally, the enclosure should, for reasons of safety, be formed of electrical insulating material which is as completely fireproof and waterproof as is humanly possible to make it.

Accordingly, the primary object of the present invention is the provision of a grade-level enclosure of the type described which provides efficient solutions to all of the above enumerated problems, in that it is embedded sufficiently deeply in the ground ordinarily to be based in solid, undisturbed earth and is therefore not likely to shift or tilt, while still providing surface access to the apparatus it contains, in that it includes a closure lock and securing means which is highly tamper resistant, which is thoroughly ventilated but is so constructed to resist insertion of foreign objects through the ventilation openings thereof, which efficiently disposes of any moisture which may enter it, which provides means facilitating the entry of underground cables and conduits thereinto, and which is formed in all pertinent elements thereof of non-conductive materials which are completely fire and waterproof.

Other objects are simplicity and economy of construction, and efficiency and dependability of operation.

Figure 2:
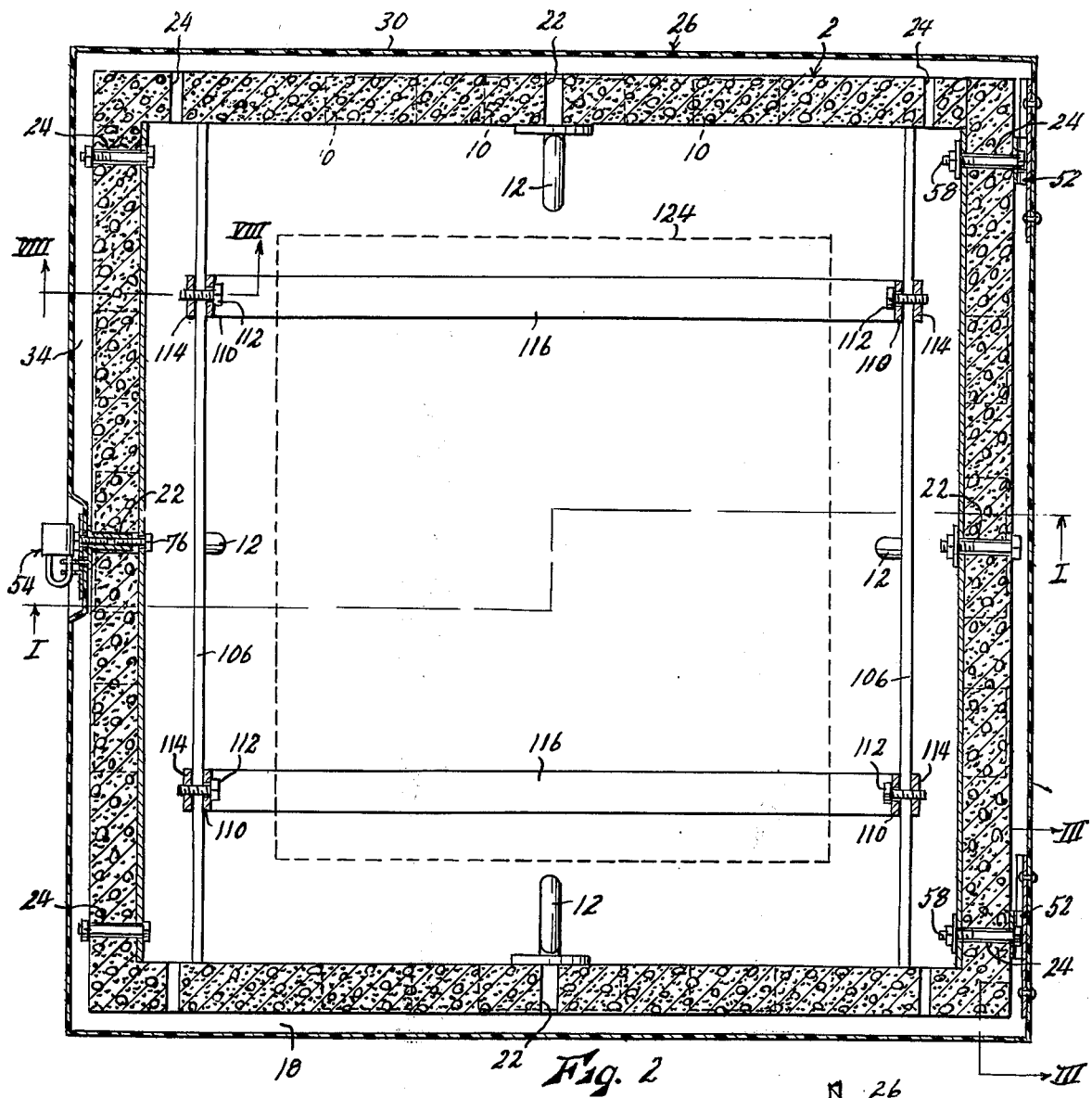
Figure 3:
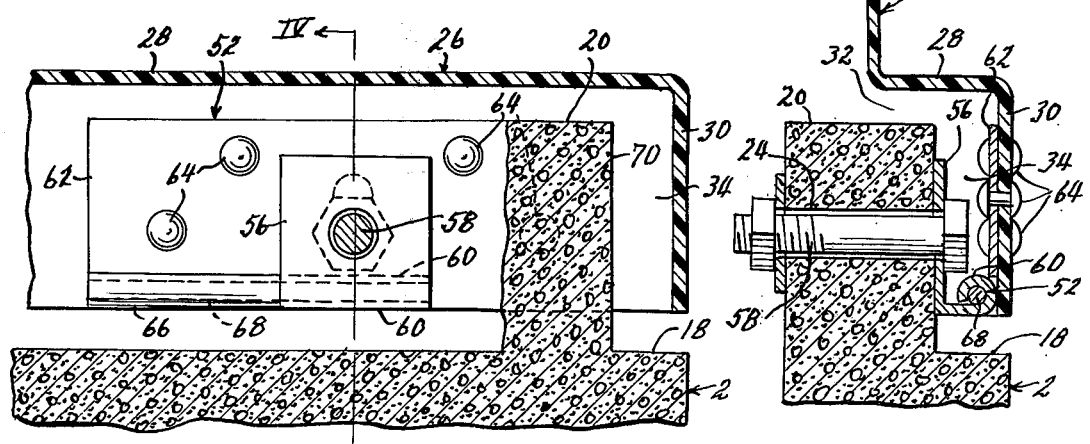
Figure 4:
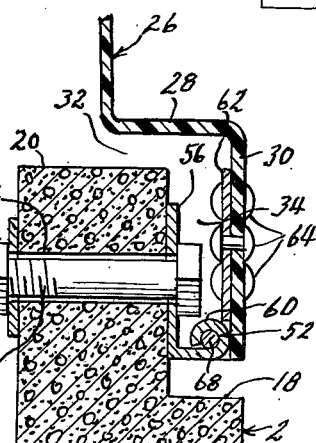

With these objects in view, as well as other objects which will appear in the course of the specification, reference will be had to the accompanying drawing, wherein:

FIG. 1 is a slightly irregular vertical sectional view of an enclosure embodying the present invention, taken generally on line I—I of FIG. 2, shown embedded in the ground, FIG. 2 is a sectional view taken on line II—II of FIG. 1, FIG. 3 is an enlarged, fragmentary sectional view taken on line III—III of FIG. 2, FIG. 4 is a fragmentary, sectional view taken on line IV—IV of FIG. 3, FIG. 5 is an enlarged, fragmentary front elevational view of the enclosure, showing the lock and related elements, FIG. 6 is a fragmentary sectional view taken on line VI—VI of FIG. 5, FIG. 7 is a fragmentary sectional view taken on line VII—VII of FIG. 5, FIG. 8 is an enlarged, fragmentary sectional view taken on line VIII—VIII of FIG. 2, and FIG. 9 is a sectional view taken on line IX—IX of FIG. 1.

Like reference numerals apply to similar parts throughout the several views, and the numeral 2 applies generally to a concrete "box", which may be suitably reinforced by steel bars, not shown, embedded therein in a manner well known in the art. Said boxes may be pre-fabricated for use at any site. As shown, the box is horizontally square and is open at both top and bottom ends. While it may be of any desired horizontal dimensions, an inside dimension of about 3 feet square has been found practical in many cases. It is adapted to be embedded in an excavation 4 (see FIG. 1) formed therefor in ground 6, resting at its lower end on a bed 8 of crushed rock or the like provided therefor at the base of the excavation, and extending above ground level as shown. If the box is of sufficient vertical height (about 3 feet has been found sufficient at most construction sites), its lower end will be supported on undisturbed, fully compacted earth, and be supported thereby against shifting or tilting due to shifting or settling of the surface ground. This is important since the box supports and carries the entire weight of the apparatus to be housed in the enclosure, and any such shifting or tilting would move the apparatus out of plumb. It is also important that the lower end of the box be disposed above the water table level of the underlying earth, but at a depth at least equal to that at which underground electrical cables and conduits are ordinarily buried.

Along the lower edge of each of the box walls there are provided a series of areas 10 of reduced thickness, any of which may be knocked out with a hammer or the like to provide openings through which underground electrical cables or conduits may be led into the box. Thus cable-conduit openings may be provided at any desired side of the box at any time, with no necessity of the time-consuming and expensive operation of drilling the concrete in the field. Any reinforcing steel rods used in the concrete do not traverse these areas of reduced thickness. Just above areas 10, at the midpoint of the width of each of the four walls of the box, an eyebolt 12 extends through a cored bolt hole 14, and is secured by a nut 16 disposed externally of the box, the eyes being disposed internally of the box. Said eyes may be used for the attachment of slings or hoisting cables to lower the box into the ground excavation, or may be used as "pulleys" through which ropes or the like may be trained and extended through knock-out openings 10 at the opposite side of the box for use in pulling underground cables or conduits into the box. At its upper ends, the walls of box 2 are reduced in thickness to provide a horizontal external ledge 18 extending peripherally therearound, said ledge being disposed above ground level. Both said ledge, and also the extreme upper edges 20 of the box walls, are disposed horizontally. Midway in elevation between ledge 18 and upper edges 20, three cored bolt holes are formed through each of the box walls, one hole 22 midway of the width of each wall, and two holes 24 respectively adjacent the vertical sides of each wall. The disposition of holes 22 and 24 in each of the four walls of the box is identical, and said holes, together with eye-bolt holes 14 and knock-out spaces 10, may be cored out during the original casting of the concrete box.

Box 2 is normally closed by a cover indicated generally by the numeral 26, and having the form of a box open at its lower end. Said cover may be formed of any suitable lightweight, durable, fireproof, waterproof electrical insulating material, a molded fiber glass plastic material being preferred. Said cover is horizontally square, and its walls are horizontally outwardly offset at their lower edge portions to form first a horizontal ledge 28 and then a vertical skirt 30 depending from the outer edge of said ledge. When said cover is closed, and supported by the hinge and lock devices to be described, it will be seen that cover ledge 28 is spaced above top edge 20 of the box, the space therebetween being indicated by the numberal 32, and that cover skirt 30 is spaced outwardly from the vertical walls of the box with its lower edge spaced above box ledge 18, the space between said vertical box walls and said skirt being indicated by the numeral 34. Spaces 32 and 34 provide a ventilating air inlet to the enclosure formed by the box and cover. An air outlet opening 36 is formed centrally in the generally horizontal top wall 38 of the cover. Said opening may be of any desired horizontal contour (square as shown), and the cover is formed to present an upstanding lip 40 surrounding said opening. The opening is covered by a hood member 42 including a horizontal top wall 44 of greater horizontal dimensions than opening 36 and being spaced above lip 40, and a vertical skirt 46 depending peripherally from said top wall, said skirt being spaced outwardly from lip 40 and terminating in spaced apart relation above cover top wall 38. Said hood member is permanently secured in this position by bracket angles 48 permanently molded into the cover and hood member. Thus it will be seen that air can escape from the cover interior around substantially the entire periphery of the hood member, as indicated by arrows 50 in FIG. 1.

Cover 26 is detachably secured to box 2 by a pair of hinge devices 52 disposed along one side of the lower edge of the cover, and a locking device 54 disposed at the opposite side of the lower edge of the cover. As shown in FIG. 2, there are two hinge devices 52, disposed respectively adjacent the extreme opposite edges of one side of the cover, which may be termed the "back" of the cover. The details of each hinge device are best shown in FIGS. 3 and 4. Each device includes a first hinge plate 56 secured against the external surface of the reduced upper edge portion of one side of box 2, within space 34, by a bolt 58 inserted through one of bolt holes 24 of the box, and forming a cylindrical, horizontal hinge pin barrel 60 at its lower edge, said barrel being spaced outwardly from the box at the inner surface of cover skirt 30, a second hinge plate 62 permanently secured to the inner surface of cover skirt 30 by rivets 64, and forming a cylindrical hinge pin barrel 66 at its lower edge, barrel 66 being disposed in end-to-end coaxial relation with barrel 60, and a hinge pin 68 fixed axially in barrel 66 and slidably and rotatably engaged in barrel 60. Thus the cover can be pivoted upwardly to an open position in which it uncovers box 2 by the action of said hinges, and can also be completely disengaged from the box by sliding hinge pins 68 axially free from hinge barrels 60, since the hinge pins of both hinges are disengagable in this manner by movement in the same horizontal direction, as will appear from an examination of FIG. 2. This disengagement of the cover from the box is often desirable when servicing the enclosed apparatus, in permitting access from all four sides of the box. However, it will be noted in FIG. 3 that the movement of the cover axially of the hinges required to free the hinge pins from hinge barrels 60 is greater than the horizontal thickness of the space 34 between cover skirt 30 and the outer surface 70 of the reduced upper edge portion of the box. Therefore, the hinges can be disconnected in the manner described only when the cover is completely open so that cover skirt 30 is disposed above the top edge 20 of the box, and that the hinges cannot be disconnected in this manner when the cover is closed. Therefore, the locking device 54 securing the cover closed, as will be described, also secures the hinges against disconnection by unauthorized persons. The rivets 64 are permanent and cannot be released even though the outer ends thereof are exposed exteriorly of the cover, and the heads and the nuts of bolts 58 are concealed and inaccessible when the cover is closed.

The locking device 54 is disposed at the edge of cover 26 opposite to that at which hinges 52 are mounted, or at the "front" of the cover, substantially midway of the horizontal width thereof, and is shown in detail in FIGS. 5–7. It includes a first plate 72 disposed flat against outer surface 70 of the box and having affixed thereto at right angles an internally threaded tube 74 which is inserted slidably into one of holes 22 of the box, but does not extend all of the way through the box wall. A cap screw 76 with its head disposed inside the box extends outwardly through hole 22 and is threaded into tube 74, whereby to secure plate 72 in place. Plate 72 extends downwardly to engge box ledge 18, whereby the plate is positively secured against rotation about the axis of tube 74. A padlock tab 78, having the form of a vertically planar finger, is rigidly affixed to and extends outwardly from plate 72. A portion 80 of cover skirt 30 in the region of the locking device is offset horizontally inwardly so as to abut or lie closely adjacent the outer surface of plate 72 when the cover is closed. The skirt 30 is notched upwardly from its lower edge, as indicated at 82, to receive tab 78 as the cover is closed. A second plate 84 is secured flat against the external surface of offset portion 80 of the cover skirt, as by rivets 86, and is also notched upwardly from its lower edge, as indicated at 88, to receive tab 78 as the cover is closed. Affixed to plate 84 is a second lock tab 90 extending outwardly therefrom, tab 90 also having the form of a vertically planar finger and positioned to be disposed in side-by-side relation to tab 78 when the cover is closed. Tabs 78 and 90 have apertures 92 and 94 formed respectively therethrough, said apertures being coaxially aligned when the cover is closed for receiving the hasp portion 96 of a padlock 98 therethrough. A cap screw 100 is inserted inwardly through matching holes provided therefor in plate 84 and cover skirt 30, and threaded into the outer end of tube 74 to secure the cover closed, in addition to the locking action of padlock 98.

It will be noted that cap screw 100 is provided with a pentagonal head. This comparatively rare screw head shape renders it unlikely that an unauthorized person would possess the wrench necessary for loosening and removing this screw, and is therefor in itself a security feature. Also, it will be noted that the body 102 of padlock 98, when said padlock is applied as described, overlies the outer surface of the screw head, blocking application of a socket wrench to the screw head even if an unauthorized person should possess such a wrench. Also, any radial application of an open-end or box wrench to the screw head is blocked from one side by locking tabs 78 and 90, from the opposite side by cover skirt 30 adjacent offset portion 80 thereof, from below by box ledge 18, and from above by an outturned portion 104 of plate 84 which overhangs the screw head. Therefore, to open the cover, padlock 98 must first be removed, which requires the proper key, and screw 100 then removed, which requires the proper wrench. Safety and security regulations relating to enclosures of this type generally require a "double" safety of some type.

Box 2 carries apparatus supporting means of any suitable type. As shown, the supporting means includes a pair of horizontal rails 106 extending along either pair of opposite sides of the box, internally thereof and adjacent the upper end of the box. These rails have the form of inwardly opening channels of C-configuration, and may be secured to the box walls by bolts inserted through holes 22 and 24 of the box walls. When rails 106 extend along the front and rear walls of the box, as related to cover 26, they may be secured by the same bolts and screws utilized to secure the hinge and lock devices to the box, as shown. Secured to and depending from each rail 106 are one or more vertical rails 108, identical in form to rails 106, secured to rail 106 by a coupling 110 which is secured to rails 106 and 108 by screws 112 extending through the open sides of the rail channels and engaged in friction nuts 114 disposed interiorly of said channels. By loosening the screws securing the couplings to horizontal rails 106, vertical rails 108 may be adjusted horizontally along rails 106. A horizontal rail 116, of the same C-configuration as the other rails, extends horizontally between the depending portions of corresponding vertical rails, and is secured to each end to one of said vertical rails by an angled coupling 118 secured to the related rails by screws 120 and friction nuts 122, in the same manner as couplings 110. By loosening the screws attaching couplings 118 to vertical rails 108, rails 116 may be adjusted vertically. Rails 116 thus constitute cradles which are both horizontally and vertically adjustable, for supporting a transformer 124 (indicated in dotted lines) or other apparatus within the enclosure. This specific type of apparatus supporting rack is exemplary only. Other types of supports may be used, either in substitution for or in addition to that shown. The apparatus must be disposed to permit pivotal opening of the cover, but this still permits utilization of most of the interior space of the cover. The equipment may be disposed partially above and partially below ground level, as shown. This permits a lower profile of the enclosure above ground level than if the equipment were mounted on a surface slab or pad, and the low profile is a desirable feature.

The operational features of the device are considered to have been adequately described in connection with the above description of its construction. The enclosure will be seen to possess numerous advantages. The enclosure box and cover are waterproof and fireproof, for maximum safety, durability, and ease of maintenance, and are electrically non-conductive, for maximum safety. The box is set sufficiently deeply in the ground that in most installations it may be set while the site is still in preparation, while the surface earth may still be loose and before the ultimate grade level and inclination is finally determined. Use of the box, extending well below grade level, rather than a surface slab or pad, permits equipment such as transformer 124 also to extend at least partially below ground level, thereby providing a lower above-ground profile for a more attractive, less obtrusive appearance, while still remaining fully accessible for ease of maintenance and servicing. Knock-out areas 10 of the box permit formation in the field of just those openings which may be required for underground conduits or cables in each particular installation, without necessity of concrete boring or other operations which are difficult and tedious to perform in the field. Eye bolts 12 provide easy and convenient "pulleys" for ropes or the like used to pull conduits or cables into the box, or as anchoring points for pulling tackle for this purpose, as well as providing internal attachment points for hoist cables or the like used for handling the box and lowering it into excavation 4. The enclosure is fully ventilated, as is necessary due to the large amounts of heat generated by the enclosed apparatus, air entering the enclosure through space 32–34 between the lower edge of cover 26 and the upper edge of box 2, and leaving the enclosure, due to rising convection currents therein, through the space between top lip 40 of the cover and hood member 42. In this connection, it will be noted that both of these air flow spaces, in cross-sectional configuration, are of a double dog-leg contour, rendering it extremely difficult for a child, or any other unauthorized person, to insert foreign objects, such as sticks, rods, wires or the like, into the enclosure. This is a valuable safety provision in view of the high voltages often present in the enclosed apparatus. This configuration of the necessary air ventilation openings also causes any rain or other moisture deposited on the outer surface of the cover to drain away externally of the enclosure. Any such moisture which might be blown into the enclosure by wind, through space 32–34 or under hood 42, drains into the ground through the open bottom of the box.

The enclosure is also quite sufficiently secure to meet safety regulations. Access thereto requires both the proper key for padlock 98, and also an unusual wrench fitting the pentagonal head of screw 100, neither of which is likely to be in the possession of unauthorized persons. Cover 26 may, as previously described, be completely removed from the box when said cover is fully raised, for better access to the box interior and the enclosed equipment, by slipping hinge pins 68 axially free of hinge barrels 60, but this cannot be done with the cover closed, and hence also requires the proper key and wrench. The heads and nuts of the bolts 58 securing the hinge devices 52 to the box, and of screws 76 and 100 securing the locking device 54 to the box, are completely concealed by the cover, so that access thereto cannot be had by unauthorized persons when the enclosure is closed and locked. Rivets 64 and 86, respectively of the hinge and lock devices, are exposed exteriorly of the enclosure, but these are permanent fastener devices the removal of which would require special tools.

The device is also convenient and economical in use. The four sides of box 2 are identical, each including knock-out areas 10, eye-bolt 12, and cored holes 22 and 24 for receiving the bolts and screws for mounting the hinge and locking devices. Thus the box may be installed originally before the final equipment content, cable-conduit pattern relative thereto, and desired orientation of the cover (i.e. the direction of opening) have been finally decided. The areas 10 to be knocked out can be determined at any later time. Hinges 52 can be installed at any of the four sides of the box, with lock 54 then being installed at the opposite side. Furthermore, the reorientation of the cover at any time, to open in a different direction, requires only the removal of the two hinge bolts 58, and the single lock mounting screw 76. The adjustable apparatus support formed by rails 106, 108 and 116 may also be installed with rails 106 at any two opposite sides of the box, as desired. However, this type of apparatus support is exemplary only, many different types of supports being available for this purpose, which the present enclosure may easily be adapted to receive. In this connection, note for example that upper edge surface 20 of the box is completely free and unobstructed, since ledge 28 of the cover is spaced thereabove by the thickness of air flow space 32. This permits surface 20 to be used to support various types of arms, cradles, brackets and the like often used in various types of apparatus supports.

While I have shown and described a specific embodiment of my invention, it will be readily apparent that many minor changes of structure and operation could be made without departing from the spirit of the invention.

What I claim as new and desire to protect by Letters Patent is:

1. A grade-level enclosure for electrical or other apparatus comprising:
    a. an open-topped box adapted to be embedded in the ground with its upper end extending above ground level,
    b. support means carried by said box and operable to support electrical apparatus disposed within said box and extending above the top thereof,
    c. a cover of waterproof, electrical insulating material having the form of an open-bottomed box adapted to cover said box and the apparatus contained therein, said cover having a horizontal configuration at its bottom generally corresponding to the horizontal configuration of said box at its top, the lower portion of said cover, when closed, surrounding and enclosing the upper portion of said box with a horizontal spacing therebetween, and
    d. securing means fastening the bottom of said cover securely but releasably to the top of said box, said securing means comprising:
        1. a pair of hinges securing the lower edge of one side of said cover pivotally to the upper edge of the corresponding side of said box, for pivotal movement in a vertical plane, each of said hinges comprising a hinge plate affixed to said box and including a horizontal cylindrical hinge barrel, a second hinge plate affixed to said cover, and a hinge pin affixed to said second hinge plate and being slidably and rotatably inserted into said hinge barrel, the pin being detachable from said barrel only by horizontal movement of said cover relative to said box, whereby to detach said cover from said box, by a distance greater than the horizontal-spacing between the box and the lower edge portion of said cover, whereby said cover cannot be detached from said box when said cover is closed, and
        2. a locking device operable to secure the lower edge of the opposite side of said cover releasably to the upper edge of the opposite sides of said box.

2. A grade-level enclosure for electrical or other apparatus comprising:
    a. an open-topped box adapted to be embedded in the ground with its upper and extending above ground level,
    b. support means carried by said box and operable to support electrical apparatus disposed within said box and extending above the top thereof,
    c. a cover of waterproof, electrical insulating material having the form of an open-bottomed box adapted to cover said box and the apparatus contained therein, said cover having a horizontal configuration at its bottom corresponding to the horizontal configuration of said box at its top, the lower portion of said cover, when closed, surrounding the upper portion of said box and extending below the top thereof, and
    d. securing means fastening the bottom of said cover securely but releasably to the top of said box, said securing means comprising:
        1. a pair of hinges securing the lower edge of one side of said cover pivotally to the upper edge of the corresponding side of said box, for pivotal movement in a vertical plane, and
        2. a locking device operable to secure the lower edge of the opposite side of said cover releasably to the upper edge of the opposite side of said box, said locking means comprising an internally threaded tube fixed in the wall of said box, the portion of said cover overlapping said box having an aperture formed therethrough which is axially aligned with said tube when said cover is closed, and a horizontal screw inserted through said aperture and threaded into said tube, the head of said screw being disposed externally of said cover.

3. An enclosure as recited in claim 2 wherein the head of said screw is of pentagonal contour.

4. An enclosure as recited in claim 2 with the addition of:
 a. a first perforated tab affixed to said box,
 b. a second perforated tab affixed to said cover, the perforations of said tabs being coaxially aligned when said cover is closed, and
 c. a padlock the hasp of which is inserted through and secured in said tab apertures, said padlock having a body portion which then overlies the head of said screw to block axial wrench access thereto.

5. An enclosure as recited in claim 4 wherein the head of said screw is of pentagonal contour.

6. An enclosure as recited in claim 4 wherein are provided obstructions blocking radial wrench access to said screw head, said obstructions being provided by configurations of said cover, said box and said perforated tabs.

7. A grade-level enclosure for electrical or other apparatus comprising:
 a. an open-topped box adapted to be embedded in the ground with its upper end extending above ground level,
 b. support means carried by said box and operable to support electrical apparatus disposed within said box and extending above the top thereof,
 c. a cover of waterproof, electrical insulating material having the form of an open-bottomed box adapted to cover said box and the apparatus contained therein, said cover having a horizontal configuration at its bottom corresponding to the horizontal configuration of said box at its top, said box and said cover being horizontally square, the lower portion of said cover surrounding the upper portion of said box when said cover is closed, and
 d. securing means fastening the bottom of said cover securely but releasably to the top of said box, said securing means comprising a pair of hinges securing the lower edge of one side of said cover pivotally to the upper edge of the corresponding side of said box, for pivotal movement in a vertical plane, and a locking device operable to secure the lower edge of the opposite side of said cover releasably to the upper edge of the opposite side of said box, the box mounted portions of said hinges and said locking device being affixed to said box each by a single screwtype releasable fastener engaged in a preformed aperture formed therefor in a wall of said box, access to said fasteners being blocked by said cover when said cover is closed, each of the four walls of the box being provided with identical patterns of fastener holes, whereby said cover may be oriented relative to said box to open selectively in any of four different horizontal directions.

* * * * *